(12) United States Patent
Honjo

(10) Patent No.: US 6,321,027 B2
(45) Date of Patent: Nov. 20, 2001

(54) VIDEO SIGNAL RECORDER AND METHOD OF RECORDING VIDEO SIGNALS

(75) Inventor: Masahiro Honjo, Sakai (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/164,727

(22) Filed: Oct. 1, 1998

(30) Foreign Application Priority Data

Oct. 1, 1997 (JP) .................................................. 9-268503

(51) Int. Cl.[7] ......................................................... H04N 5/92
(52) U.S. Cl. ............................. 386/111; 386/112; 386/125
(58) Field of Search .............................. 386/46, 107, 117, 386/111, 112, 125, 126, 124; 358/906, 909.1; H04N 5/92

(56) References Cited

U.S. PATENT DOCUMENTS

| 5,134,487 | * | 7/1992 | Taguchi et al. | 358/906 |
| 5,432,769 | * | 7/1995 | Honjo | 386/46 |
| 5,523,857 | * | 6/1996 | Fukushima | 386/125 |

FOREIGN PATENT DOCUMENTS 9-135458   5/1997  (JP) .

\* cited by examiner

Primary Examiner—Huy Nguyen
(74) Attorney, Agent, or Firm—Ratner & Prestia

(57) ABSTRACT

When a recording instruction is absent, a recording medium drive is not driven. Encoding of a video signal and driving of the drive are both started simultaneously when recording instruction is given. The coded data is sequentially recorded and stored in a memory. When the drive reaches a desirable rotational speed for recording, the stored data are sequentially read and recorded.

6 Claims, 3 Drawing Sheets

VIDEO SIGNAL RECORDER AND METHOD OF RECORDING VIDEO SIGNALS

FILED OF THE INVENTION

The present invention relates to a video signal recorder for recording video signals through coding the video signals by digital compression such as the MPEG (moving picture experts group) standard.

BACKGROUND OF THE INVENTION

Recorders employing tape, disc and other mediums have been proposed to record digitally encoded video signals.

These recorders typically require driving the recording media. These conventional recorders are thus unable to record information or data immediately after a recording instruction. In other words, several seconds are required before the driving becomes stable, when video signals are ready to be recorded. A delay for several seconds is thus inevitable from an instance when a user want to record video signals.

A method for reducing this delay has been proposed, namely, to keep driving the medium during a "pause" period. When a disc is employed as a recording medium, the disc is kept rotating during a pause period, and when a tape is employed, a cylinder is kept rotating during the pause period. In these cases, electric power is consumed although the recorder does not record anything. This can be a serious problem, for example, to a battery-driven camcorder.

SUMMARY OF THE INVENTION

A video signal recorder of the present invention comprises the following elements:

(a) coding means for encoding video signals, (b) memory means for storing the coded data, (c) record means for recording the coded data in a recording medium, (d) drive means for driving the recording medium, (e) control means for controlling all the above means or one of the above means.

The control means does not drive the drive means when a record instruction is not given. When a record instruction is given, substantially at the same time, the control means starts coding with the coding means. The control means also sequentially stores data coded in a coding circuit into a semiconductor memory. When the drive reaches to a predetermined rotational speed, the controller reads out the data stored in the memory, and then converts the data into record signals in a recording circuit. Finally, the controller records the signals in the record medium.

DETAILED DESCRIPTION OF THE PREFERRED EMBODIMENT

Figure 1:
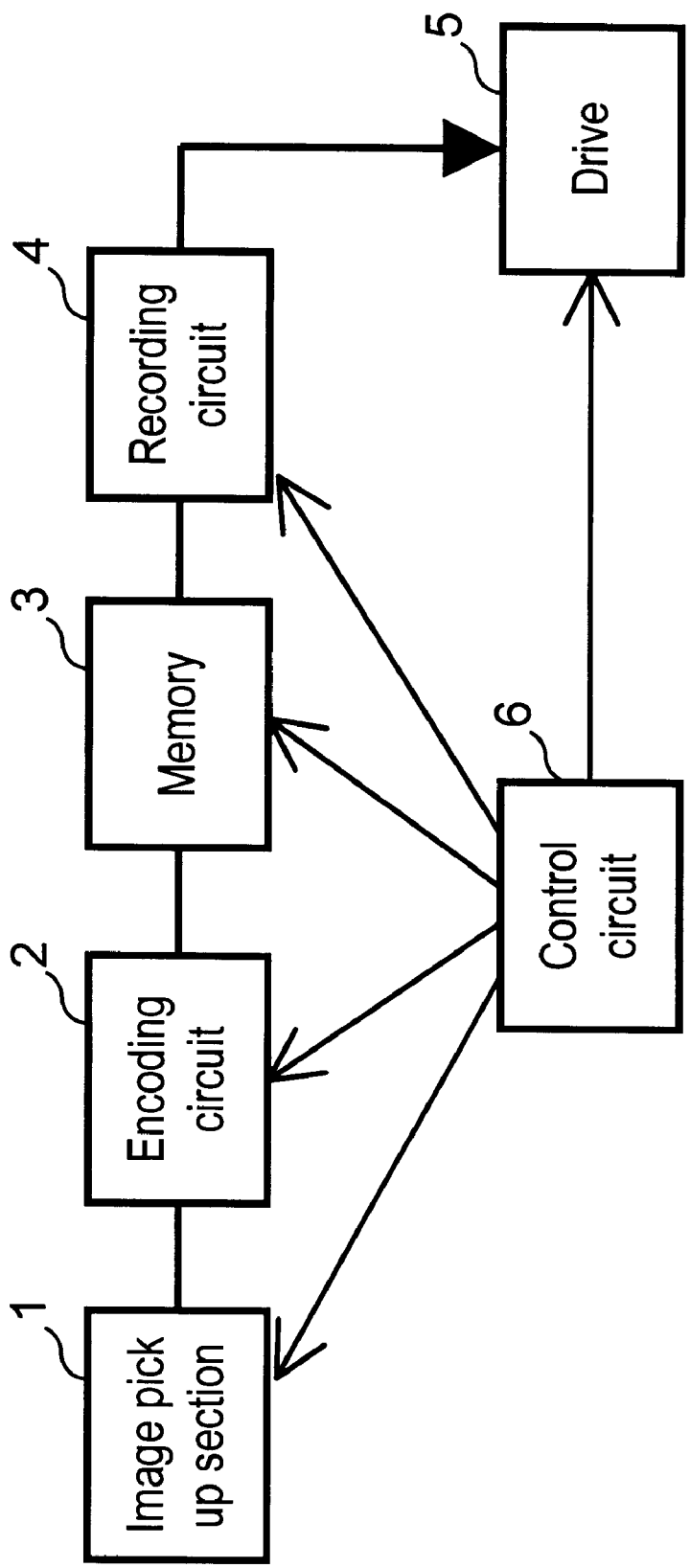
FIG. 1 is a block diagram of an exemplary embodiment of the present invention.
Figure 2:
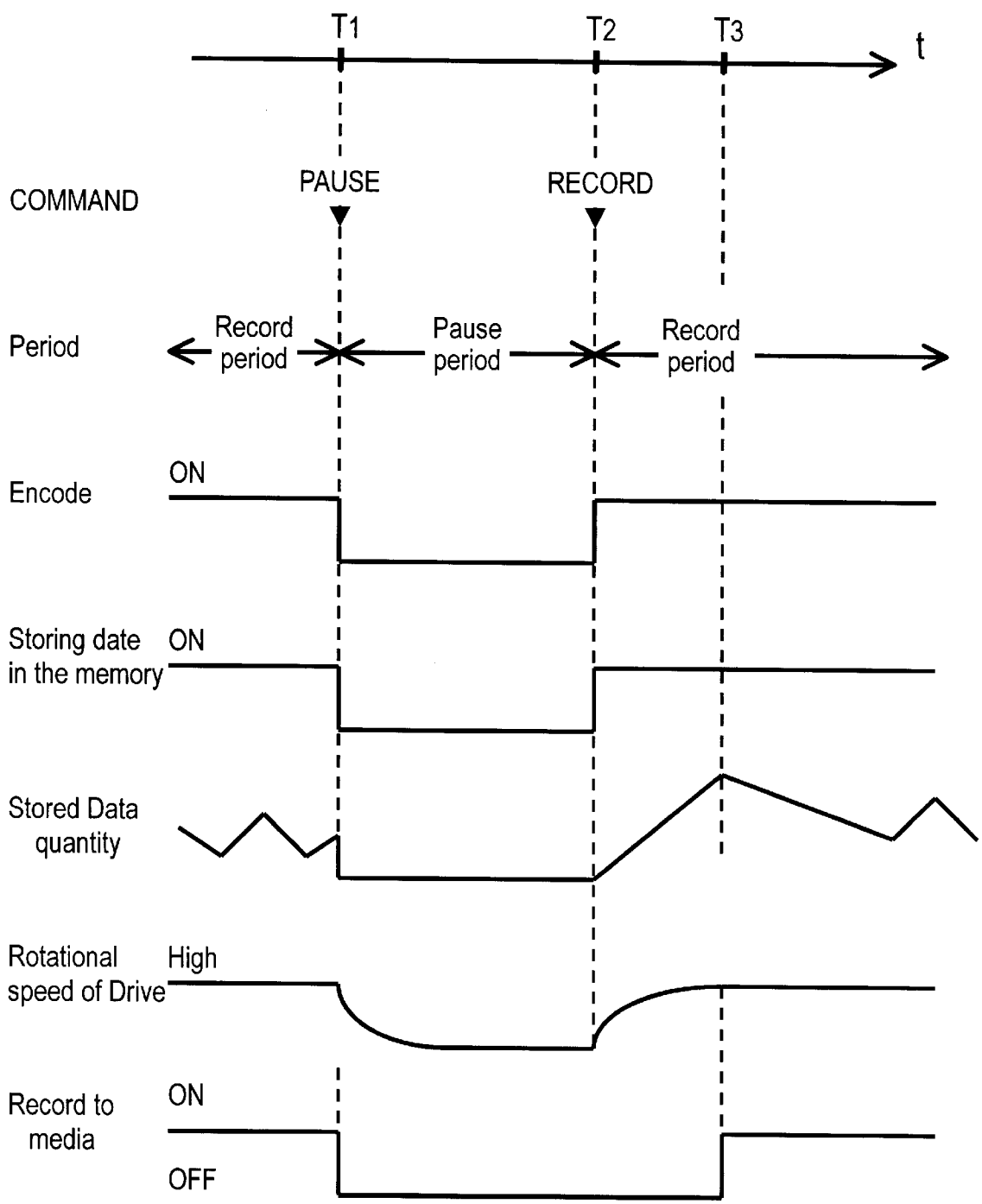
FIG. 2 is a timing chart illustrating an operation of an exemplary embodiment of the present invention.
Figure 3:
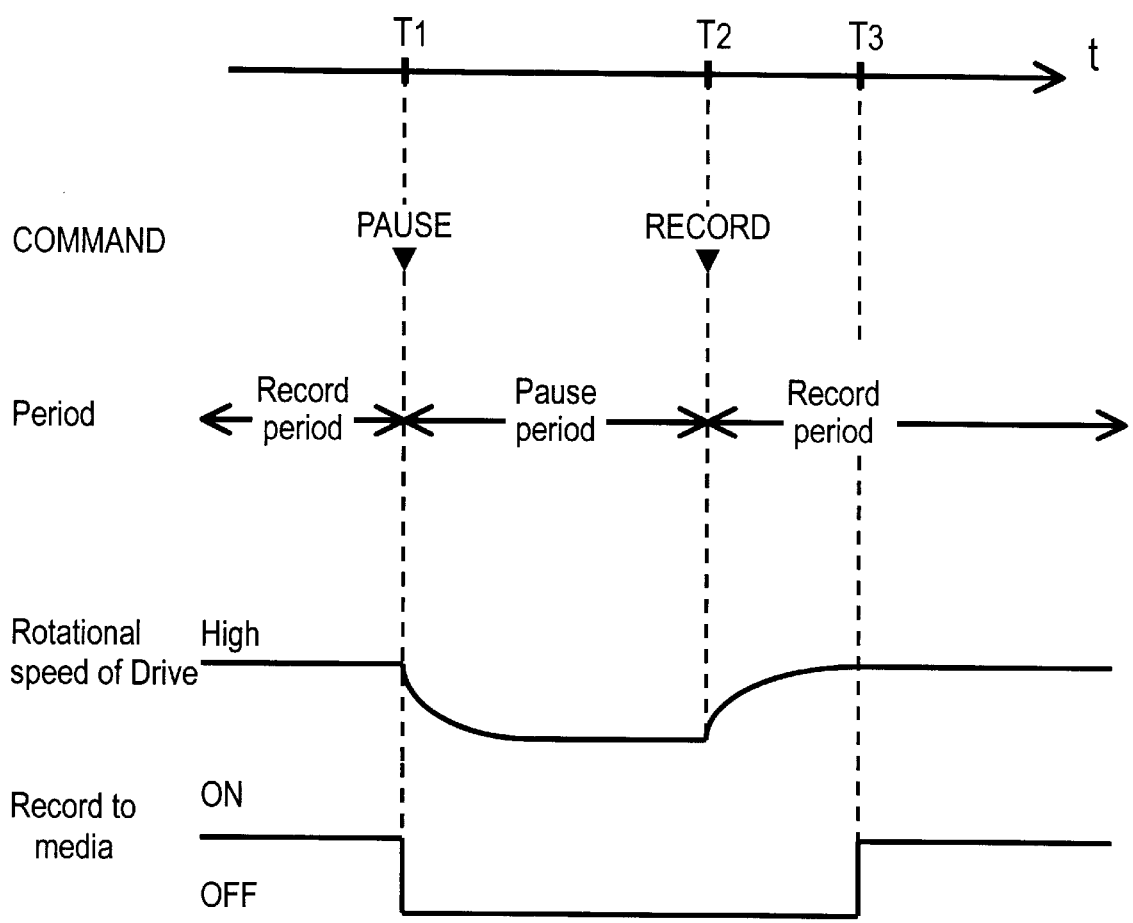
FIG. 3 is a timing chart depicting operation of a prior art device.

An exemplary embodiment of the present invention is described by referring to FIGS. 1 through 3.

FIG. 1 is a block diagram depicting an exemplary embodiment of the present invention. An image pick up section 1 outputs video signals, which are digitally encoded in a coding circuit 2. There are two coding methods; one is a fixed rate coding method in which the coding rate is fixed, another is a variable rate coding method in which the coding rate varies momentarily responsive to complexities of video signals. Both of these methods can be used. An output from an encoding circuit 2 is stored in and is read out from a memory 3, and then is converted into a recording signal in a recording circuit 4. The record signal is recorded in a recording medium mounted on a drive 5. The memory 3 temporarily stores the data supplied from the encoding circuit 2. A control circuit 6 controls these blocks.

A timing chart according to an exemplary embodiment of the present invention is compared with that of the prior art. FIG. 3 is a timing chart of the prior art. In FIG. 3, instructions from outside, operation modes of a recorder, and rotational speeds of a drive that drives a disc or the like are indicated on a horizontal axis showing a time base. A recording mode is firstly indicated. When a pause is instructed at the time T1, the drive stops. Then, a pause-release (start recording) is instructed at the time T2, and the drive starts driving. At the time T3, the record medium reaches to a predetermined speed where the medium is ready to record, then the medium starts recording at this moment.

The difference between T2 and T3 delays the start of recording, which is a problem to be solved.

FIG. 2 is a timing chart depicting operation of the present invention. The operation in FIG. 2 corresponds to that showed in FIG. 3. In FIG. 2, instructions from outside, operation modes of a recorder, rotational speeds of a driver, coding periods, stored quantity in a memory, periods of recording data are indicated on a horizontal axis showing a time base.

A recording mode is firstly indicated. When a pause is instructed at the time T1, the drive stops. Then, a pause-release (start recording) is instructed at the time T2, and the drive starts driving. At the time T3, the record medium reaches to a predetermined speed where the medium is ready to record, then the medium starts recording at this moment. So far the operation is the same as that of the prior art. However, coding is started in the encoding circuit 2 at T2, the same time when a recording instruction is given, and the coded data is stored in the memory 3. A linear increase of stored quantity in the memory between T2 and T3 indicates this situation.

Because a rate of recording is set at a higher level than a maximum rate of coding, the stored data quantity in the memory decreases step by step by a difference between the recording rate and coding rate when recording medium starts recording at T3. In due course, the recording alters to an intermittent recording. The intermittent recording operates as follows: When data quantity stored in a memory is greater than a predetermined level Al, a record medium records the data in the medium. When the data quantity is less than a predetermined level A2, the recording in the medium is stopped. Thus the data is recorded intermittently.

When a variable coding rate is employed, the rate of recording is set at a higher level than the maximum rate of the variable coding. During the intermittent recording operation, when the stored data quantity becomes stable, an average rate of coding approximates to an average rate of recording from a macro view of point.

A period of recording data starts at T2 when the record instruction is given as shown in FIG. 2. In other words, after the instruction, video signals are coded and recorded without delay, and no power is consumed during the pause period.

There are some prior art devices that keep driving a recording medium even during the pause period, thereby reducing a delay. However, these prior art devices also keep consuming electric power due to driving, which still leaves a problem. Thus the present invention has a great advantage with regards to power savings.

In this exemplary embodiment, the encoding in the coding circuit 2 and the storing in the memory 3 simultaneously start with the record start instruction. However, the coding circuit 2 and memory 3 can be operated during the pause period. Then, a video signal picked up before a storing instruction is given can be also recorded. To record such a video signal, however, it is desirable that a co-relation between the time until a rotational speed reaches to a predetermined speed from starting and the capacity of the memory 3 be set appropriately.

The recording medium used in this embodiment can be an optical disc, magneto-optical disc, magnetic disc, or magnetic tape. Whichever of these media is used, they are within the scope of the present invention. When a disc is used, the disc halts or rotates at a predetermined speed. When a tape is used, a cylinder on which a head is mounted halts or rotates at a predetermined speed. A camcorder was referred to previously. However, the present invention is not limited to this product but also relates to a system receiving video signals from outside and having no internal image pick up section.

What is claimed is:

1. A video signal recorder comprising:
   (a) inter-frame encoding means for coding a video signal of a moving image the encoding means employing a variable bit rate code to vary data quantity in response to video signal complexity;
   (b) memory means for storing coded data corresponding to the video signal;
   (c) recording means for converting the stored coded data into a record signal;
   (d) drive means for selectively driving a recording medium,
   (e) control means for controlling an intermittent recording in which the recording means records data to the recording medium when the data quantity stored in the memory means is greater than a predetermined amount A1, and recording being halted when the data quantity stored in the memory means is less than a predetermined amount A2, the control means selectively driving the drive means, refraining from driving the drive means when a record instruction is absent, when a record instruction is given, substantially at the same time, enables coding with the encoding means, actuates the drive means, and sequentially store data coded with the encoding means into the memory means, after a delay, a record operation is performed to read out the data stored in the memory means, then convert the data into record signals with the recording means when the drive means reaches a predetermined rotational speed, and finally recording the signals to the record medium,
   wherein the maximum rate of the variable bit rate code is less than a recording rate of a recording medium so that no information is lost during the delay between the time of the record instruction and the performance of a record operation.

2. The video signal recorder as defined in claim 1, wherein the video signal is produced at an image pick-up device.

3. The video signal recorder as defined in claim 1, wherein the recording medium is one of an optical disc, magnetic disc, magneto-optical disc and magnetic tape.

4. The video signal recorder as defined in claim 1, wherein in a case the record instruction is absent, said control means pauses the recording of signals to the medium.

5. A method of recording a video signal comprising steps of:
   (a) meter-frame encoding the video signal of a moving image immediately upon receiving a record instruction, an inter-frame signal is produced employing a variable bit rate in which data quantity varies per frame in accordance with video signal complexity;
   (b) storing the inter-frame signal as coded data in a memory immediately upon receiving a record instruction;
   (c) generating a record instruction when the inter-frame signal quantity stored in the memory is greater than a predetermined amount A1, and when a recording medium is driven to a predetermined speed;
   (d) recording the coded data to the recording medium after a record instruction and corresponding delay during a record operation, and halting the recording when the data quantity stored in the memory is less than a predetermined amount A2,
   wherein a maximum rate of said variable bit rate is set smaller than a recording rate of the recording medium.

6. The method of recording video signals as defined in claim 5, wherein in a case that the record instruction is absent, said storing and inter-frame encoding steps are performed.

* * * * *

UNITED STATES PATENT AND TRADEMARK OFFICE
CERTIFICATE OF CORRECTION

PATENT NO. : 6,321,027 B2
DATED : November 20, 2001
INVENTOR(S) : Masahiro Honjo It is certified that error appears in the above-identified patent and that said Letters Patent is hereby corrected as shown below:

<u>Column 4,</u>
Line 25, delete "meter-frame" and insert -- inter-frame --

Signed and Sealed this

Fourth Day of June, 2002

*Attest:*

*Attesting Officer*

JAMES E. ROGAN
*Director of the United States Patent and Trademark Office*